US006675113B2

(12) United States Patent
Hars

(10) Patent No.: US 6,675,113 B2
(45) Date of Patent: Jan. 6, 2004

(54) MONOBIT-RUN FREQUENCY ON-LINE RANDOMNESS TEST

(75) Inventor: Laszlo Hars, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 129 days.

(21) Appl. No.: 10/106,949

(22) Filed: Mar. 26, 2002

(65) Prior Publication Data

US 2003/0187598 A1 Oct. 2, 2003

(51) Int. Cl.$^7$ ................................................ G06F 19/00
(52) U.S. Cl. ........................................ 702/75; 702/81
(58) Field of Search ..................... 380/268; 708/250, 708/251, 252, 253, 254, 255, 256; 702/75, 81, 123

(56) References Cited

U.S. PATENT DOCUMENTS 5,675,649 A * 10/1997 Brennan et al. ............ 380/286
5,781,458 A *  7/1998 Gilley ......................... 708/255
6,076,097 A *  6/2000 London et al. ............. 708/250
6,104,811 A *  8/2000 Aiello et al. ................. 380/46

OTHER PUBLICATIONS

Johansson, A.J.;"Analysis of Formal Randomness in a Chaotic Random Number Generator"; Proceedings 43$^{rd}$ IEEE Intrnt'l Symposium on Circuits and Systems; vol. 2, Aug. 8–11, 2000; pp. 724–725.*

Kohda, T:"Eigenvalue of Pseudorandom Number Generator Determining Randomness of Random Sequence";IEEE Intrnt'l Symposium on Circuits and Systems; vol. 2, Jun. 11–14, 1991; pp. 1109–1112.*

* cited by examiner

Primary Examiner—John Barlow
Assistant Examiner—Douglas N Washburn

(57) ABSTRACT

The present invention is a method and apparatus for testing the random numbers generated by a random number generator in real time. A stream of random bits is generated using said random number generator, then the generated random bits undergo a monobit-run length operation in which a plurality of sub-sequences having one of all 0's or all 1's bits in a row is identified. The output of said monobit-run length calculation is applied to an exponential averaging to obtain an average number of occurrences or frequencies for a range of monobit-run lengths. The monobit-run length frequencies are compared to predetermined acceptance ranges, so that if any of the average monobit-run frequency values falls repeatedly outside the predetermined acceptance range more than a predetermined number of times, it is determined that the generated random bits are insufficiently random.

20 Claims, 2 Drawing Sheets

MONOBIT-RUN FREQUENCY ON-LINE RANDOMNESS TEST

BACKGROUND OF THE INVENTION

1. Field of the Invention

The present invention pertains to the field of random number generators and, in particular, to a digital data processing apparatus and method for generating true binary random sequences.

2. Description of the Related Art

Random-number generators are fundamentally important in this computer age. A truly random sequence is difficult to generate in real application. For example, heat is typically generated in the hardware component of the random number generator when it generates a series of 1's and 0's over a time period. Generating a 1 bit could consume more power than a 0 bit. As such, if a long sequence of 1 bits is generated, the electrical circuit becomes hot. Thus, if the circuit generates a 1 bit when it is hot, the circuit will "latch up" and generate mostly 1 bits but rarely a 0 bit. A different effect may occur if a 0 bit is generated when the circuit is hot. In this case a long sub-sequence of 1 bits becomes too rare and constitutes a non-random property. In random sequences where occasionally long sub-sequences consist of equal bits of long 0's or 1's, the biased 0/1 frequency error will have catastrophic consequences of breaching security.

Accordingly, both the detection of hardware tampering and a component failure are necessary when conducting randomness tests. Conventional randomness tests are performed through extensive statistical testing, such as chi-squared tests, delta tests, and the like, on a sequence of generated random numbers. However, such tests are very expensive to be performed in real time as they require a great amount of computational processing power.

SUMMARY OF THE INVENTION

The present invention overcomes the above-described problems, and provides additional advantages by providing a method and apparatus for providing an on-line randomness test to ensure that the generated random numbers are less susceptible to crypto-analysis by an unauthorized party.

According to an aspect of the invention, a method for testing randomness is provided. The method includes the steps of: generating a continuous stream of random binary bits; applying the generated random bits to an exponential monobit-run frequency operation to compute average monobit-run frequency values for a range of monobit-run length values; and, determining whether the generated random bits are sufficiently random by comparing the output of the exponential monobit-run frequency operation to a predetermined acceptance range, wherein the exponential monobit-run frequency operation involves identifying a plurality of sub-sequences having one of all 0's or 1's bit subsequences in a row. The method further includes the steps of: determining that the generated random bits are insufficiently random when any of the average monobit-run frequency value falls repeatedly outside the predetermined acceptance range more than a predefined number of times; notifying that the generated random bits are insufficiently random when any of the average monobit-run frequency value falls repeatedly outside the predetermined acceptance range more than a predefined number of times; generating a new set of random binary bits when any of the average monobit-run counts falls repeatedly outside the predetermined acceptance range more than a predefined number of times; and, denying the generated random bits for a subsequent application when the generated random bits are determined to be insufficiently random.

According to another aspect of the invention, a method for evaluating the random numbers generated by a random number generator is provided. The method includes the steps of: (a) generating a stream of random bits using the random-number generator; (b) applying the generated random bits to a monobit-run length operation; (c) applying the output of the monobit-run length operation to an exponential averaging to obtain average monobit-run frequency values for a range of monobit-run lengths; (d) comparing the average monobit-run frequency values to a predetermined acceptance range; and, (e) determining whether any of the average monobit-run frequency values falls outside the predetermined acceptance range more than a predefined number of times. The method further includes the steps of repeating the steps (a)–(e) until any of the average monobit-run frequency values falls outside the predetermined acceptance ranges; notifying that insufficiently random numbers are generated when the steps (a)–(e) are repeated more than the predefined number of times. The generated random bits are considered insufficiently random when any of the average monobit-run frequency values falls outside the predetermined acceptance range more than the predefined number of times.

According to a further aspect of the invention, an apparatus for evaluating the random numbers generated by a random number generator is provided. The apparatus includes means for generating random sequences comprising of binary bits; means for detecting whether the generated random sequences are insufficiently random based on an exponential monobit-run frequency operation; and, means for controlling the flow of the generated random sequences for a subsequent application when the generated random sequences are determined to be insufficiently random, wherein the exponential monobit-run frequency operation is performed to compute average number monbit-run frequency values for a range of monobit-run lengths on the generated random sequences and wherein, if the any output of the exponential monobit-run operation repeatedly falls outside a predetermined acceptance range more than a predefined number of times determining that the generated random sequences are insufficiently random. The apparatus further includes means for transmitting an alarm signal that the generated random sequence is insufficiently random when any of the average monobit-run frequency values falls repeatedly outside the predetermined acceptance range more than the predefined number of times, and means for generating a new set of random bits when any of the average monobit-run frequency values falls repeatedly outside the predetermined acceptance range more than the predefined number of times.

Yet another aspect is that the present invention may be implemented in hardware, software, or a combination of hardware and software as desired for a particular application.

Furthermore, the present invention may be realized in a simple, reliable, and inexpensive implementation.

These and other advantages will become apparent to those skilled in this art upon reading the following detailed description in conjunction with the accompanying drawings.

DETAILED DESCRIPTION OF THE EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
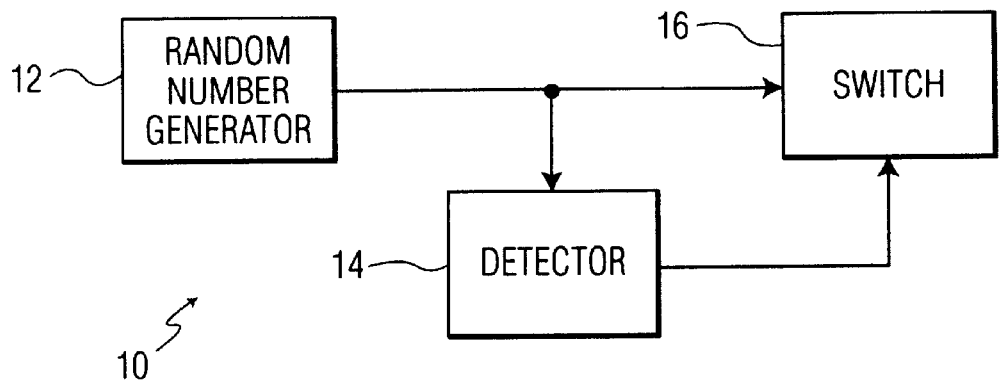
FIG. 1 illustrates a simplified block diagram of the random-number generating module according to an embodiment of the present invention.

FIG. 1 illustrates a simplified block diagram of a random-number-generating system 10 according to an exemplary embodiment of the present invention. The system 10 includes a random-number generator (RG) 12, a detector 14, and a switch 16. Note that the term, "random number" means any sequence of binary signals, a Gaussian or any other distribution of signals, a sequence of signals representing a number between zero and one, a sequence of signals representing a decimal number, or any other form that includes the desired randomness.

In operation, the RG 12 is operable to output a series of random numbers. It should be noted that the RG 12 in this disclosure means any device that produces a signal that can be converted to a sequence of binary bits in any conventional or unconventional manner. As the random numbers are generated, the detector 14 detects whether the RG 12 is generating sufficiently random sequences according to predetermined criteria (explained later). The switch 16 stops the flow of the generated random numbers when the generated random numbers are deemed insufficiently random by the detector 14. However, if they are determined to be truly random, the switch 16 allows the generated random numbers for a subsequent application, such as any circuit, system, process, gambling application, simulation, statistical sampling, Diffie-Hellman key exchanges, or the like which uses the random numbers supplied by the RG 12. Thus, the switch 16 may represent an input to a cryptography system, an audio or video noise generator, a computer program, or other devices and processes.

Now, a description will be made in detail in regards to determining whether the generated random numbers are sufficiently random with reference to FIGS. 2 and 3.

Figure 2:
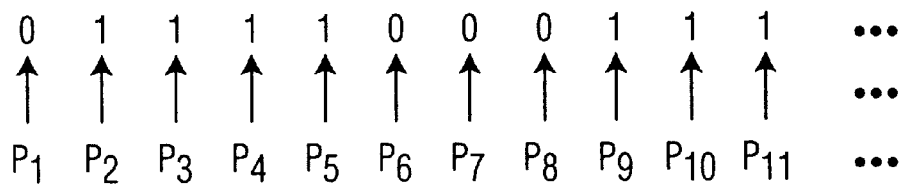
FIG. 2 shows a diagram showing the randomness test performed on a sequence of random numbers according to an embodiment of the present invention; and, FIG. 3 is a flow chart illustrating the operation steps of testing the statistics of the generated random numbers according to an embodiment of the present invention.

Referring to FIG. 2, the random numbers are tested in real time while the RG 12 is in operation to ensure that the generated random numbers are sufficiently random according to an embodiment of the present invention. In operation, a continuous stream of random bits is generated by the RG 12. At the same time, the detector 14 computes the monobit-run frequency of the random bit stream. In particular, the detector 14 detects all subsequences of length k, having either 0's or 1's in a row. During detection mode, each time a new random bit is generated, it is checked whether the new bit continues a previous monobit run. If the new bit is different from the previous bit, the run length k, is determined. For example, as shown in FIG. 2, when a continuous stream of random bits is generated, three consecutive 0's $S_3$ (indicated by $P_6$, $P_7$, and $P_8$) and four consecutive 1's $T_4$ (indicated by $P_2$, $P_3$, $P_4$, and $P_5$) are observed by the detector 14.

In the embodiment, the monobit-run counting process runs continuously. As such, the counters or accumulators A must be cleared periodically to avoid overflow. To this end, an exponential averaging is utilized in the present invention, in which the accumulator A is decreased with a certain $0<\alpha<1$ factor before the counting addition is performed, so it never becomes too large. That is, to save storage and execution time, exponential averaging to the auto-correlation calculations is applied in the present invention. The exponential averaging has the property that each time the average is updated in an accumulator A, the old averaged values will have a diminishing effect. It should be noted that there are various counting methods that can be implemented in accordance with the techniques of the present invention; however, exponential averaging is preferably used, as described below.

The exponential averaging works in the following way. Each time a numeric value b is read, a factor, $\alpha$, which falls between 0 and 1 ($0<\alpha<1$), is multiplied to the accumulator A and then b is added to it: $A_{new} = \alpha \cdot A_{old} + b$. To have useful averaging effects, the value for $\alpha$ is selected to be close to 1, $\alpha = 1 - 1/n$, $n \gg 1$. In this case, log $\alpha \approx -1/n$ and the half-life of the averaged bit is $k \approx n \cdot \log 2 \approx 0.30103 \cdot n$. After n steps, the weight of the oldest averaged value becomes $(1-1/n)^n \approx 1/e \approx 0.367879$. Here, e is the basis of the natural logarithm (the Euler constant), so the term, n, can be referred to as the natural life of the averaged values. If all values to be averaged were 1's, the accumulator value is $1 + \alpha + \alpha^2 + \ldots = 1/(1-\alpha) = n$, whereas if all bits were 0's the accumulator value is 0. Note that the expected value of the exponential average is the exponential average of the expected values of the individual random variables. If they are evenly distributed binary bits, the expected value is $\frac{1}{2} + \frac{1}{2}\alpha + \frac{1}{2}\alpha^2 + \ldots = n/2$.

As described above, the exponential averaging serves to clear the counter as the accumulator is decreased with a certain $0<\alpha<1$ factor; thus, the accumulator never becomes too large during the operation mode. Once the exponential averaging is performed for each accumulator, the value of exponential averaging is compared to a predetermined acceptance range. That is, it is determined whether the generated random number pattern will be substantially random by comparing the value of each accumulator to the predetermined acceptance range value. If the value of any accumulator falls out of the predetermined range value during the averaging process, it is inferred that the generated random numbers would not be unpredictable. Here, a threshold value may be set to notify the user when the test fails repeatedly.

To help understand deriving the predetermined acceptance range, the following mathematical expressions are used. In the list of all $2^n$ bit-sequences of length n there are $2^{n-k-2}$ all '0' subsequences of length k starting at any fixed bit position $2, 3, \ldots, n-k$. Thus, there are $(n-k-1)2^{n-k-2}$ possible length k runs of bits '0' in the middle of some bit-sequence of length n. There are $2^{n-k-1}$ all '0' sub-sequences in the beginning of some length n bit-sequence. The same number of sub-sequences occurs at the end, which adds up to $2^{n-k}$. All together, if k n-2, there are $(n-k+3)2^{n-k-2}$ length k runs of bits '0' in bit-sequences of length n. If k=n 1, there are two such sub-sequences, and if k=n, there is only one such sub-sequence. If k is sufficiently small, the number of runs can be larger than the number of length n sequences. Note that the same is true for the number of length k runs of bits '1'.

Examining n bits the expected number of k-length runs of bits '0' is (n k+3)/$2^{k+2}$, the same as the expected number of k-length runs of bits '1'. Accordingly, the predetermined acceptance range can be chosen by setting the boundary that is centered around (n−k+3)/$2^{k+2}$. Thus, the outer boundary can be expressed as: [(n−k+3)/$2^{k+2}$α, (n−k+3)/$2^{k+2}$+b]. The exact boundary can be selectively adjusted based on the data obtained from extensive simulations with a known, good source of random numbers, in which an ideal monobit-run frequency can be obtained. Such random sequences are commercially available and can be downloaded, for example, from various web sources, including "www.fourmilab.ch/hotbits" and "lavarand.sgi.com." Thus, the actual range used in the test is selectively set by an operator so that a choice can be made of different sensibilities as to whether the generated random sequence is predictable to an unauthorized party.

Figure 3:
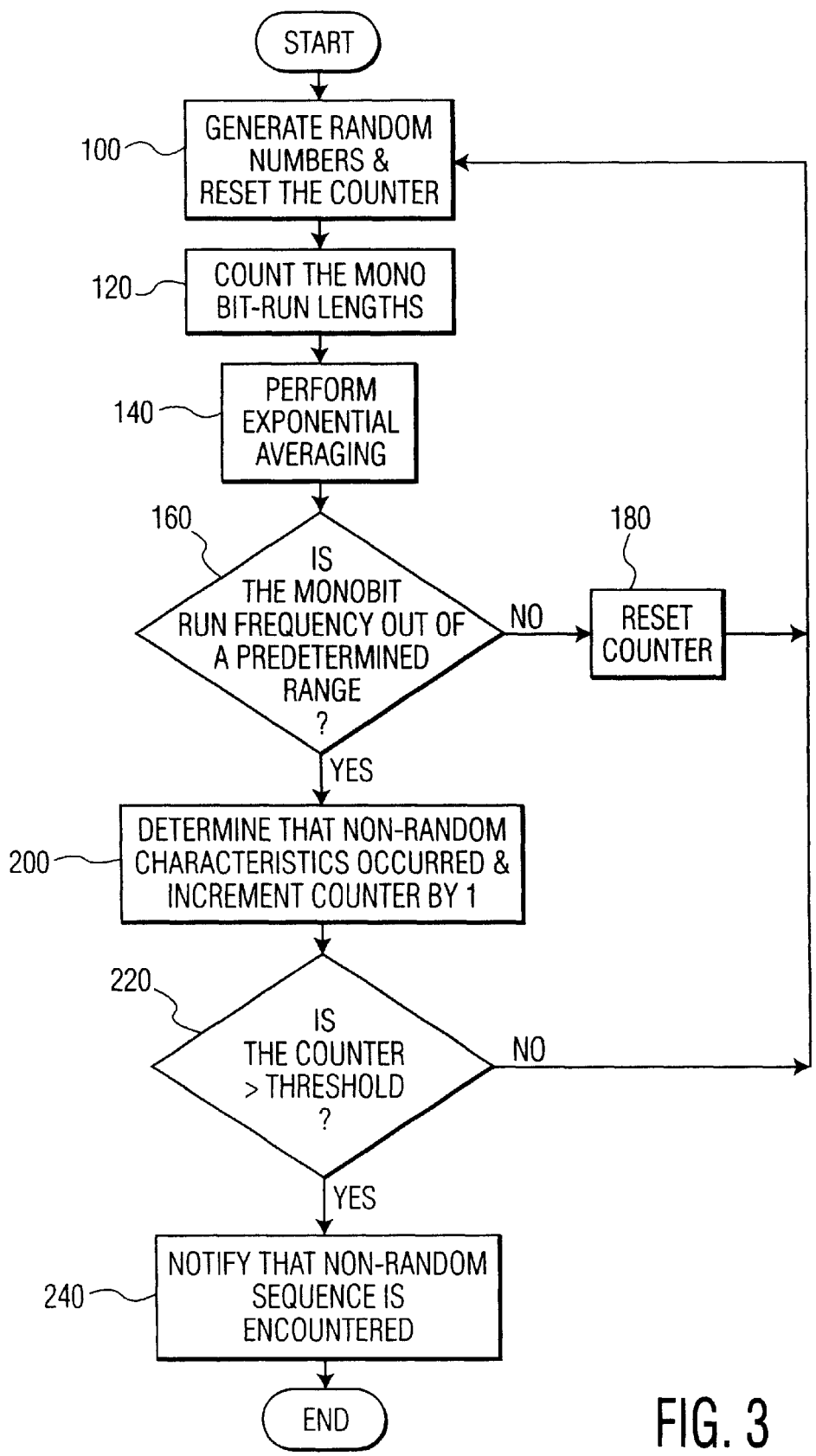

FIG. 3 is a flow chart illustrating the operation steps for testing the statistical quality of the random sequence in accordance with the present invention. The rectangular elements indicate computer software instruction, whereas the diamond-shaped element represents computer software instructions that affect the execution of the computer software instructions represented by the rectangular blocks. Alternatively, the processing and decision blocks represent steps performed by functionally equivalent circuits such as a digital signal processor circuit or an application-specific-integrated circuit (ASIC). It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

The randomness test operates on a continuous stream of random binary bits generated by the random-number generator 12 in step 100. In step 120, the generated random bits undergo a monobit-run determining process, then the length k of the monobit-run is stored in an accumulator. Each time a monobit-run is found, a set of exponential average monobit-run frequency values is updated which count how often a particular monobit-run length has occurred. All exponential average monobit-run frequency values are reduced by a factor a (0<α<1) and only the one corresponding to the monobit-run length k is increased by 1.

The exponential averaging operation is performed in each accumulator in step 140, so that the old average monobit-run frequency values will have a diminishing effect. These average monobit-run frequency values after the exponential averaging operation are compared to their respective predetermined acceptance ranges in step 160. If any of the values in each accumulator A is outside a predetermined acceptance range, it is determined that such patterns have been detected in step 200, which are not expected in a truly random sequence, and the counter is increased by 1. Otherwise, the counter is reset in step 180 and returns to step 100 of processing further random numbers. In step 220, if the value of the counter is greater than the threshold value, a notification that the generated random numbers are not sufficiently random is transmitted in step 240. Alternatively, the switch 16 can be deactivated to stop the flow of the random numbers for a subsequent application, or the generated random numbers can be discarded, and the whole process of generating new random numbers can be initiated in step 240. Finally, if the value of the counter does not exceed the threshold value in step 220, the processing is returned to step 100.

The various steps described above may be implemented by programming them into functions incorporated within application programs, and programmers of ordinary skill in the field can implement them using customary programming techniques in languages, such as C, Visual Basic, Java, Perl, C++, and the like. In an exemplary embodiment, the method described in FIG. 3 may be constructed as follows (using the C programming language). For simplicity we implemented the test using floating-point arithmetic.

While the preferred embodiments of the present invention have been illustrated and described, it will be understood by those skilled in the art that various changes and modifications may be made and equivalents substituted for elements thereof without departing from the true scope of the present invention. In particular, in place of the exponential averaging, other types of ordinary averaging, running average, restarted average, etc. can be used. In addition, many modifications can be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

Appendix: MS Visual C code

```
/**************************************************************\
 * RunFreq.c
 *     RunFreq <#random bits> <bit generator type> <bit generator param>
 *     Generates test bits
 *     Exponential frequencies of all k-runs of 0's or 1's (k = 2..8)
 *     Prints test statistics
 * Rem: floating point arithmetic is used.
 *     Follow the example of BitAvg.c to convert to fix point. Larger averaging
 *     length achieved if sums are decremented only at every k-th iteration !
 * RunFreq 3e7 0 0.5 ->
 * No large bias of runs
 *  101.595    155.876
 *   96.4734   158.746
 *   96.3919   160.404
 *   96.9115   160.165
 *  101.7      160.119
 *   99.1938   160.788
 *  104.392    158.286
 *   97.374    160.544
 *
 * Vers. 1.0   04/17/01: Created by Laszlo Hars
 *
\**************************************************************/
#include <stdio.h>
include <stdlib.h> define MAXFULLRUN 10
define MAXRUN2    (MAXFULLRUN-2)

#define MAX(A,B)  ((A) > (B) ? (A) : (B))
#define MIN(A,B)  ((A) < (B) ? (A) : (B))

// External function prototypes
void BitGenInit( int argc, char *argv[]);
unsigned int NextBit();

int main (int argc, char *argv[])
{
    int b0, b1, r1, i, j, n = (int)atof(argv[1]);
    double
        a[MAXRUN2]={125.0, 125.0, 125.0, 125.0, 125.0, 125.0, 125.0, 125.0},  // ideal past
        l[MAXRUN2]={95.00, 95.00, 95.00, 95.00, 95.00, 95.00, 95.00, 95.00},  // LO limit = ideal / 1.32
        h[MAXRUN2]={165.0, 165.0, 165.0, 165.0, 165.0, 165.0, 165.0, 165.0},  // HI limit = ideal * 1.32
        x[MAXRUN2]={0.0, 0.0, 0.0, 0.0, 0.0, 0.0, 0.0, 0.0},                  // max for debug, eval
        y[MAXRUN2]={1e9, 1e9, 1e9, 1e9, 1e9, 1e9, 1e9, 1e9},                  // min for debug, eval
        w[MAXRUN2]={0.99609375, 0.998046875, 0.9990234375, 0.99951171875, 0.999755859375,
                    0.9998779296875, 0.99993896484375, 0.99993896484375};   // multp = 1-1/2^(8..14,14)

if( argc < 4) {
        printf("Usage: RunFreq <#random bits> <bit generator type> <bit generator params...>\n");
        putchar('\a');                   // rings the bell
        exit(1);    }

BitGenInit(argc, argv);

b0 = NextBit();
    r1 = -1;                             // r1 = 0: runlength = 2 for(i = 1; i < n; ++i) {
        b1 = NextBit();
        if (b0 == b1) {++r1; continue;} // inside a run {here can check if run gets too long!}
        if (r1 < 0) {b0 = b1;continue;} // too short run r1 = MIN(r1,MAXRUN2-1);         // lump all long runs together for(j = 0; j < MAXRUN2; ++j) {
            a[j] = a[j]*w[j] + (j == r1);
            x[j] = MAX(a[j],x[j]);       // for debug, eval
            y[j] = MIN(a[j],y[j]);       // for debug, eval
            if (a[j] < l[j] || a[j] > h[j]) {
                printf("Too large bias of %d-run of bits %d at bit %d\n", r1+2, b0, i);
                exit(2); }
        }
        b0 = b1;
        r1 = -1;
    }
    printf("No large bias of runs\n");
    for(j = 0; j < MAXRUN2; ++j) printf("%g  %g\n", y[j], x[j]); // show the results for debug, eval
```

What is claimed is:

1. A method for testing randomness when generating a random number, the method comprising the steps of:
   generating a continuous stream of random binary bits;
   applying said generated random bits to an exponential monobit-run frequency operation to compute average monobit-run frequency values for a range of monobit-run length values; and,
   determining whether said generated random bits are sufficiently random by comparing the output of said exponential monobit-run frequency operation to a predetermined acceptance range.

2. The method of claim 1, further comprising the step of determining that said generated random bits are insufficiently random when any of the average monobit-run frequency value falls repeatedly outside said predetermined acceptance range more than a predefined number of times.

3. The method of claim 1, further comprising the step of notifying that said generated random bits are insufficiently random when any of the average monobit-run frequency value falls repeatedly outside said predetermined acceptance range more than a predefined number of times.

4. The method of claim 1, further comprising the step of generating a new set of random binary bits when any of the average monobit-run counts falls repeatedly outside said predetermined acceptance range more than a predefined number of times.

5. The method of claim 1, wherein said exponential monobit-run frequency operation involves identifying a plurality of sub-sequences having one of all 0's or 1's bit subsequences in a row.

6. The method of claim 1, further comprising the step of denying said generated random bits for a subsequent application when said generated random bits are determined to be insufficiently random.

7. A method for evaluating the random numbers generated by a random number generator, the method comprising the steps of:
   (a) generating a stream of random bits using said random-number generator;
   (b) applying said generated random bits to a monobit-run length operation;
   (c) applying the output of said monobit-run length operation to an exponential averaging to obtain average monobit-run frequency values for a range of monobit-run lengths;
   (d) comparing the average monobit-run frequency values to a predetermined acceptance range; and,
   (e) determining whether any of the average monobit-run frequency values falls outside said predetermined acceptance range more than a predefined number of times.

8. The method of claim 7, further comprising the step of determining that said generated random bits are insufficiently random when any of the average monobit-run frequency values falls outside said predetermined acceptance range more than said predefined number of times.

9. The method of claim 7, further comprising the step of:
   repeating said steps (a)–(e) until any of the average monobit-run frequency values falls outside said predetermined acceptance ranges.

10. The method of claim 9, further comprising the step of notifying that insufficiently random numbers are generated when said steps (a)–(e) are repeated more than said predefined number of times.

11. The method of claim 9, further comprising the step of generating a new set of random numbers when said steps (a)–(e) are repeated more than said predefined number of times.

12. The method of claim 7, wherein said exponential monobit-run frequency operation involves identifying a plurality of sub-sequences having one of all 0's or all 1's bits in a row.

13. An apparatus for evaluating the random numbers generated by a random number generator, comprising:
   means for generating random sequences comprising of binary bits;
   means for detecting whether said generated random sequences are insufficiently random based on an exponential monobit-run frequency operation; and,
   means for controlling the flow of said generated random sequences for a subsequent application when said generated random sequences are determined to be insufficiently random,
   wherein said exponential monobit-run frequency operation is performed to compute average number monbit-run frequency values for a range of monobit-run lengths on said generated random sequences and wherein, if the any output of said exponential monobit-run operation repeatedly falls outside a predetermined acceptance range more than a predefined number of times determining that said generated random sequences are insufficiently random.

14. The apparatus of claim 13, further comprising means for transmitting an alarm signal that said generated random sequence is insufficiently random when any of the average monobit-run frequency values falls repeatedly outside said predetermined acceptance range more than said predefined number of times.

15. The method of claim 13, further comprising means for generating a new set of random bits when any of the average monobit-run frequency values falls repeatedly outside said predetermined acceptance range more than said predefined number of times.

16. The method of claim 13, wherein said exponential monobit-run frequency operation comprises identifying a plurality of sub-sequences having one of all 0's or all 1's bits in a row.

17. A machine-readable medium having stored thereon data representing sequences of instructions, and the sequences of instructions which, when executed by a processor, cause the processor to:
   process a continuous stream of random bits;
   perform an exponential monobit-run frequency operation on said generated random bits to compute an average monobit-run frequency value for a range of monobit-run lengths; and,
   determine whether said generated random numbers are insufficiently random by comparing the output of said exponential monobit-run frequency operation to a predetermined acceptance range.

18. The memory medium of claim 17, wherein said generated random numbers are determined to be insufficiently random when any of the average monobit-run frequency values falls outside said predetermined acceptance range.

19. The memory medium of claim 17, wherein said processor is further operative to process a new set of random bits when any of the average monobit-run frequency values falls outside said predetermined acceptance range.

20. The memory medium of claim 17, wherein said exponential monobit-run operation comprises identifying a plurality of sub-sequences having one of all 0's or all 1's bits in a row.

* * * * *